United States Patent [19]

Focke et al.

[11] Patent Number: 4,531,597

[45] Date of Patent: Jul. 30, 1985

[54] APPARATUS FOR FORMING TOBACCO PORTIONS

[75] Inventors: Heinz Focke; Oskar Balmer, both of Verden, Fed. Rep. of Germany

[73] Assignee: Focke & Co., Verden, Fed. Rep. of Germany

[21] Appl. No.: 508,758

[22] Filed: Jun. 28, 1983

[30] Foreign Application Priority Data

Jul. 16, 1982 [DE] Fed. Rep. of Germany ....... 3226654

[51] Int. Cl.³ .................... G01G 13/02; G01G 13/22
[52] U.S. Cl. ................................... 177/84; 177/123; 222/77
[58] Field of Search .................. 177/84, 121, 122, 123; 222/55, 56, 77

[56] References Cited

U.S. PATENT DOCUMENTS

| 602,060 | 4/1898 | Dutton et al. | 177/84 |
| 1,115,633 | 11/1914 | Wellman | 177/84 X |
| 1,580,746 | 4/1926 | McKeighan | 177/123 X |
| 2,299,636 | 10/1942 | Mansbendel | 177/123 X |
| 2,491,056 | 12/1949 | Muskat | 177/123 X |
| 3,212,673 | 10/1965 | Hyde | 222/77 X |
| 4,034,701 | 7/1977 | Davidson et al. | 222/56 X |

Primary Examiner—E. A. Goldberg
Assistant Examiner—Patrick W. Foster
Attorney, Agent, or Firm—Sughrue, Mion, Zinn, Macpeak & Seas

[57] ABSTRACT

For the accurate metering of tobacco portions in the course of the packing of the latter, rough portions (28) are first produced by separation from a strand of tobacco and brought to the desired weight (desired portion 15) by adding difference portions measured in a fine metering device (12, 13). The rough portions (28) are fed in each case by an intermediate conveyor (13), which is in the form of a star feeder, to one of two balance receiver members (32, 33), which are likewise in the form of star feeders and each of which is connected to a precision balance (43, 44).

16 Claims, 4 Drawing Figures

APPARATUS FOR FORMING TOBACCO PORTIONS

The invention relates to an apparatus for forming portions of fibrous material, particularly cut tobacco, by separating a preferably underweight rough portion from a strand of the fibrous material and the addition of an equalising portion determined by the weighing of the rough portion, wherein a plurality of balances, in particular two, are adapted to be fed alternately with individual rough portions and the complete portions can be carried away.

For the packing of portions of cut tobacco the most accurate possible metering is necessary. Because of legal regulations, underweight portions are basically impermissible. Overweight metering should also be avoided as far as possible.

In one known apparatus for metering cut tobacco (German Application No. A 2,338,374) a continuous strand of pressed tobacco conveyed in the downward direction is first formed from the more or less disordered stock of cut tobacco. From this strand the individual rough portions are separated by a suitable separating device, and fed alternately to one or the other balance. The balances determine the difference between the respective rough portion and the (desired) portion. Fine tobacco is fed by a separate fine metering device in accordance with the shortage, until the desired portion is obtained. The latter is then passed through a hopper to a discharge conveyor.

In this known apparatus the rough and adjusted portions are guided and passed on in the region of the balances by means of pivotable flaps, which guide the portion in one direction or the other in accordance with the relative position. The portions then slide through the action of gravity downwards on the respective flaps. Because of the time required for the pivoting movements, the use of these flaps has been found disadvantageous in practice.

Taking as starting point the prior art described, the object of the invention is to provide an apparatus for portioning and metering in particular cut tobacco, in which extremely accurate portions of desired amount can be formed and transported in a very efficient manner.

In order to achieve this object, the apparatus according to the invention is characterised in that the rough portions separated from the strand are each received in a compartment of a rotatable intermediate conveyor and through the partial rotation of the latter can be fed to one or the other balance.

By means of this intermediate conveyor, which is in the form of a star feeder having compartments open towards the outside in the radial direction, efficient transfer of the separated rough portions to one or the other balance is possible, while the tobacco portions are handled gently. The star feeder only makes rotations along part of a circle in each case for the purpose of conveying a rough portion and at the same time moving a free compartment into the position for receiving the next rough portion. The star feeder is preferably formed with three compartments, each of which occupies a circumferential region of about 120°, so that a rotation of the star feeder through 120° is sufficient to bring a compartment open at the top into the position for receiving a rough portion and to bring the other two compartments into discharge positions directed obliquely downwards or towards the side. The balances, or their receiving members, are correspondingly laterally offset and disposed beneath the intermediate conveyor, so that the portions are advanced solely through the rotary movement of the star feeder.

According to a further proposal of the invention, further respective star feeders are disposed below and laterally offset relative to the intermediate conveyor in the form of a star feeder, each of them serving as balance receiver members to receive the rough portion fed by the intermediate conveyor and determining the actual weight of the portion. Each of these star feeders serving as a balance receiver member is connected directly to a precision balance by means of a balance arm, which in turn is connected to a balance beam of the precision balance. After the rough portion has been received in the balance receiver member, the weight is accordingly determined immediately. In addition, a difference portion is added directly to the rough portion, until the tobacco portion reaches the desired weight (desired portion). The latter is then passed on to a discharge conveyor by the balance receiver member in the form of a conveyor (star feeder).

The star feeders constituting the balance receiver members are of the same construction as the star feeder used as intermediate conveyor, or of similar construction. The relative positions of the three star feeders in relation to one another are determined by the geometrical relationships, in such a manner that in each case an upwardly directed compartment is used to receive a tobacco portion and the downwardly directed compartments are used to carry away a tobacco portion.

Each precision balance is connected to a fine metering device, which preferably corresponds to the fine metering device of German Application No. A 2,338,374. This (known) fine metering device is equipped with a number of barbed rollers which feed an accurately metered difference portion to the rough portion in the region of the balance receiver member.

The mode of operation and the control of this fine metering device are so designed that any defects in the formation of the rough portion are also appropriately taken into account. In order to obtain continuous maximum performance, the fine metering device is so adjusted that the difference portion must be fed to the rough portion within a predetermined short working cycle. If the rough portion has a weight below the predetermined margin, the difference portion cannot be fed during the working cycle. In this case the feeding of the difference portion by the fine metering device is continued until the desired portion is obtained. The respective balance receiver member is not advanced on the completion of a working cycle, but will be advanced only at the switching cycle next occurring for the balance receiver member in question.

If on the other hand the rough portion fed to the precision balance has a weight clearly below the desired weight, or above the desired weight, this rough portion is treated as a defective portion and is separately discharged by corresponding operation of the balance receiver member.

Other features of the invention relate to the structural conformation of the star feeders and of a substantially vertically disposed conveyor well for the tobacco before the formation of the rough portion.

One exemplary embodiment of the apparatus according to the invention will be explained more fully below with the aid of the drawings, in which.

Figure 1:
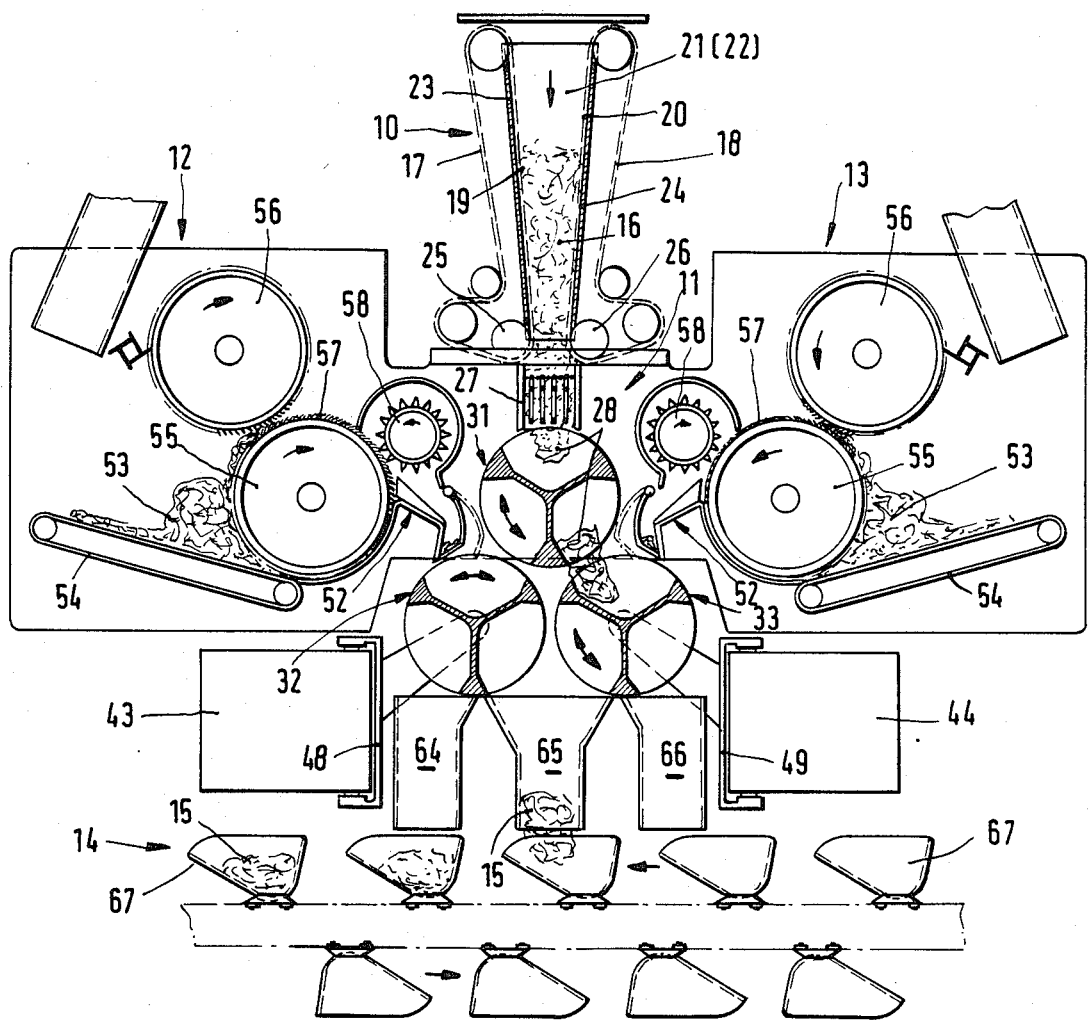
FIG. 1 shows the apparatus in side view and vertical section.
Figure 2:
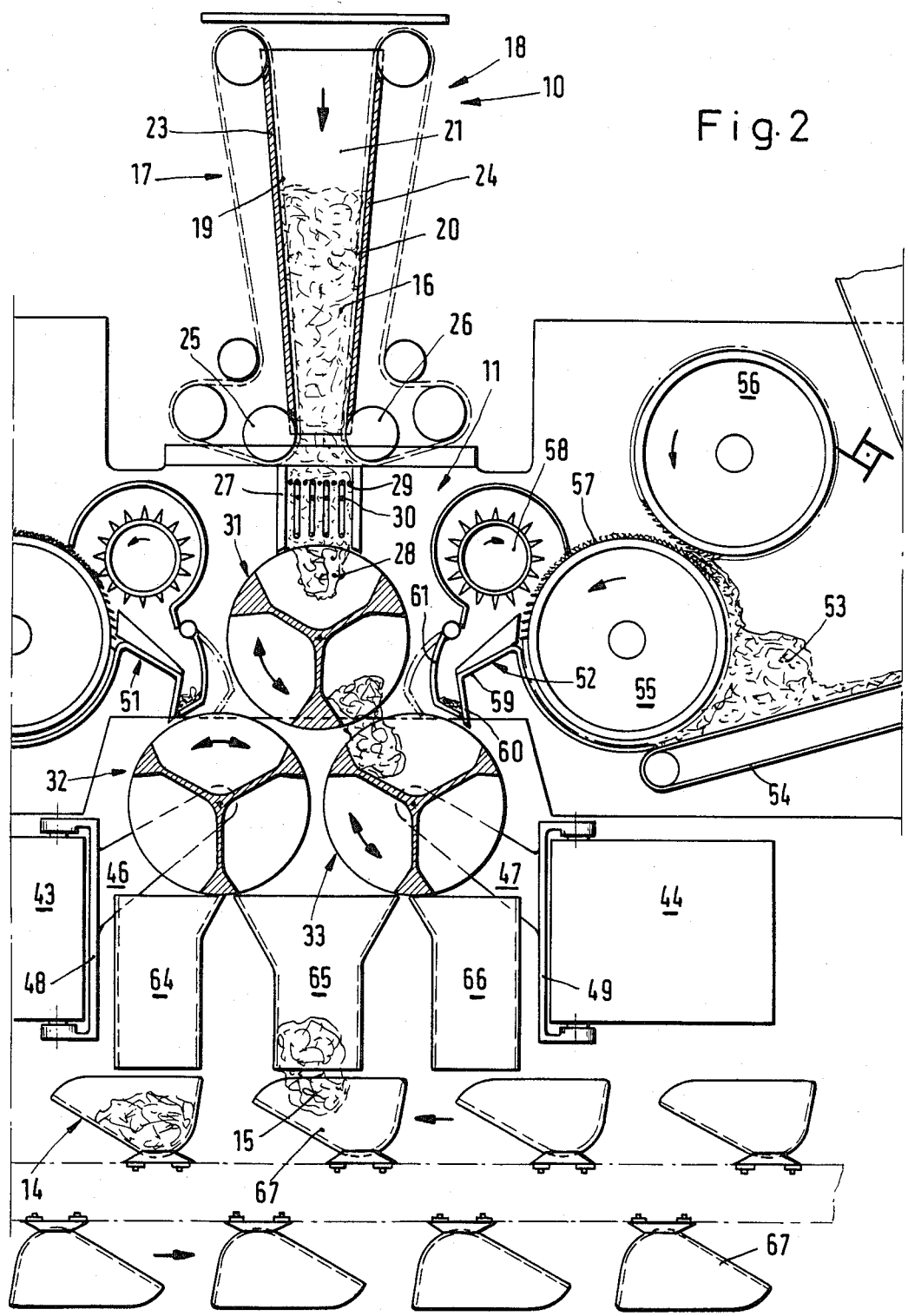
FIG. 2 shows part of the apparatus similarly to FIG. 1, but to a larger scale.

The apparatus shown as a whole in FIG. 1 corresponds in basic construction and in respect of its essential cycle of functioning to the apparatus according to German Application No. A 2,338,374. The main parts of this apparatus are an upright conveyor well 10, a portion distributor device 11, (two) fine metering devices 12 and 13, and a discharge conveyor 14 for correctly metered tobacco portions (desired portions 15).

After being appropriately prepared by suitable conveyor means (German Application No. A 2,338,374), the cut tobacco is fed to the conveyor well 10. Inside the latter a tobacco strand compressed in the direction of conveyance, that is to say downwardly, is formed. For this purpose the conveyor well 10 is formed with a cross-section decreasing in the direction of conveyance. This decrease in cross-section is in turn itself achieved by means of conveyor belts 17 and 18 which lie opposite one another and whose conveyor faces 19 and 20 respectively are guided to converge in the downward direction. The conveyor faces 19 and 20 bound the conveyor well 10 on sides opposite one another. The other two sides, offset thereto, of the conveyor well 10 are formed by fixed upright well walls 21 and 22. The conveyor faces 19 and 20 extend between the well walls 21 and 22, so that a conveyor well 10 of closed cross-section and decreasing in width in the direction of conveyance is formed. The conveyor faces 19 and 20 are held in position by fixed, downwardly converging supporting walls 23 and 24, in such a manner that a certain compacting pressure is exerted by the conveyor faces 19 and 20 on the tobacco strand 16.

The conveyor belts 17, 18 are guided over mutually offset guide rollers 25, 26 at the bottom outlet end of the conveyor well 10, so that the tobacco strand 16 can pass freely out of the conveyor well 10.

At the bottom the conveyor well 10 is followed by a fixed separating well 27. Inside the latter a rough portion 28 of tobacco is separated from the advancing tobacco strand 16. This separation is here effected with the aid of comb-like separator tools 29 and 30, through the movement of the latter relative to one another, preferably in accordance with the arrangement according to German Application No. A 2,338,374. The rough portion 28 is of such a size that as a rule it is slightly below the weight of the desired portion 15. If this weight is 50 g, the rough portion 28 is for example metered in the range between 47 and 49 g.

The aforesaid rough portion 28 is received by an intermediate conveyor 31 and by the latter is transferred alternately to one of two balance receiver members 32 and 33 for checking the weight conveyed. After the rough portion 28 has been made up to the desired weight, the desired portion 15 thus formed is passed from the balance receiver member 32 or 33 to the discharge conveyor 14.

The intermediate conveyor 31 is in the form of a star feeder comprising three compartments 34, 35 and 36 spaced about 120° apart. These compartments are open on the side lying outwards in the radial direction. The compartments 34, 35, 36 are filled in each case in an upwardly directed position (compartment 34) and are emptied, through the dead weight of the tobacco portion (rough portion 28), in the two alternative positions inclined downwards or directed towards the side. The compartments 34, 35, 36 are divided off from one another by radially directed partitions 37, 38, 39, which are spaced apart at angles of 120°. These partitions meet at the centre or axis of rotation of the star feeder, while at their radially outer ends the partitions 37, 38, 39 form thickened portions 40 of substantially triangular cross-section. These portions 40 form funnel-shaped guide surfaces 41 for the compartments 34, 35, 36, in such a manner that the tobacco portions are given a determined direction of movement, mainly when leaving a compartment 34, 35, 36. The radially inner base of the compartments 34, 35, 36 is formed with a rounding 42.

The partitions 37, 38, 39 arranged in star form and constructed in the manner described above are disposed between side discs 50, which in the present case are circular. These discs form at the same time the side boundaries of the compartments 34, 35, 36. In addition, the side discs serve to mount the shafts and drives for the rotary movement of the star feeders.

Figure 3:
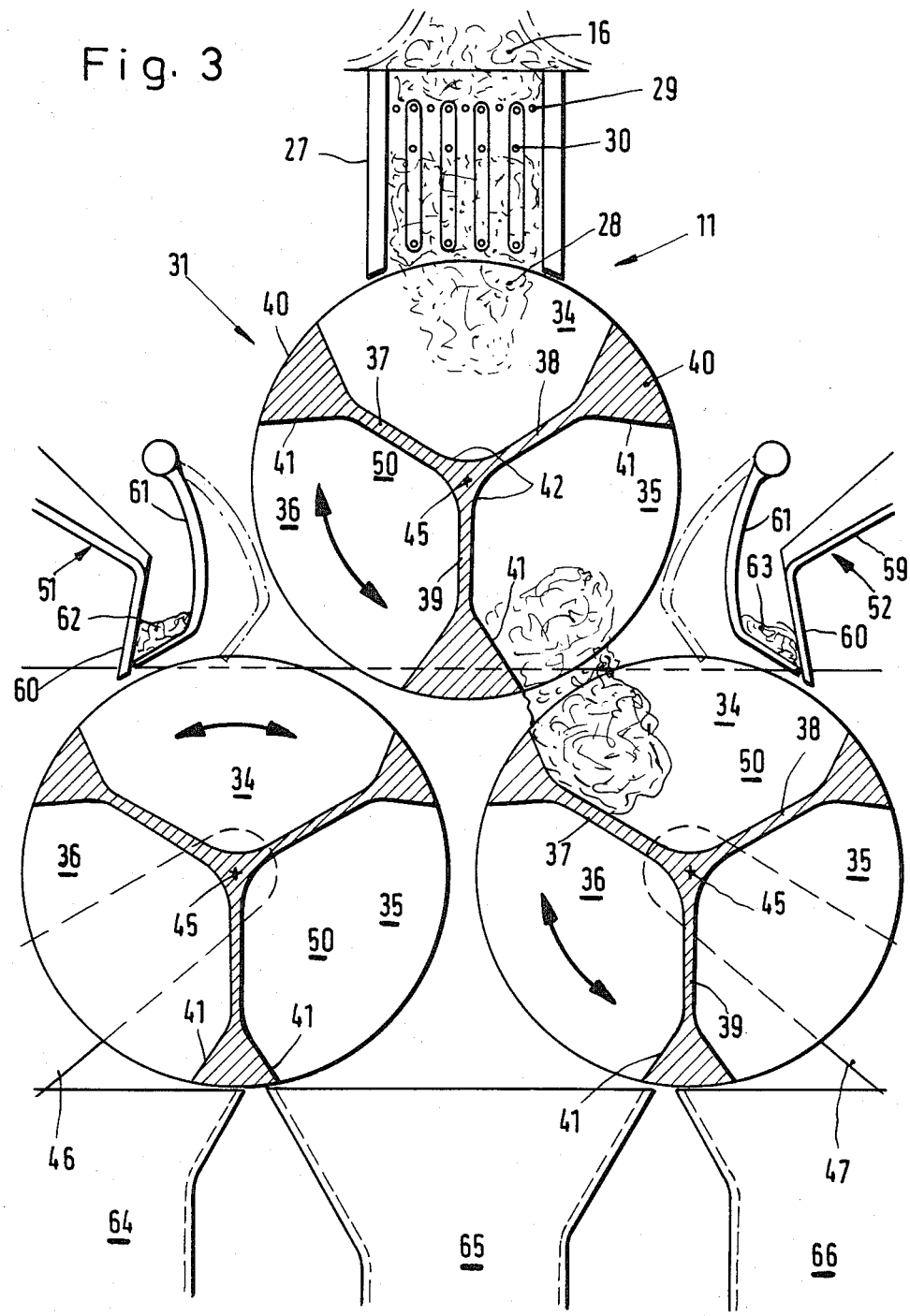
FIG. 3 shows a still further enlarged part of the apparatus, with details essential to the invention, in a similar view to FIGS. 1 and 2.
Figure 4:
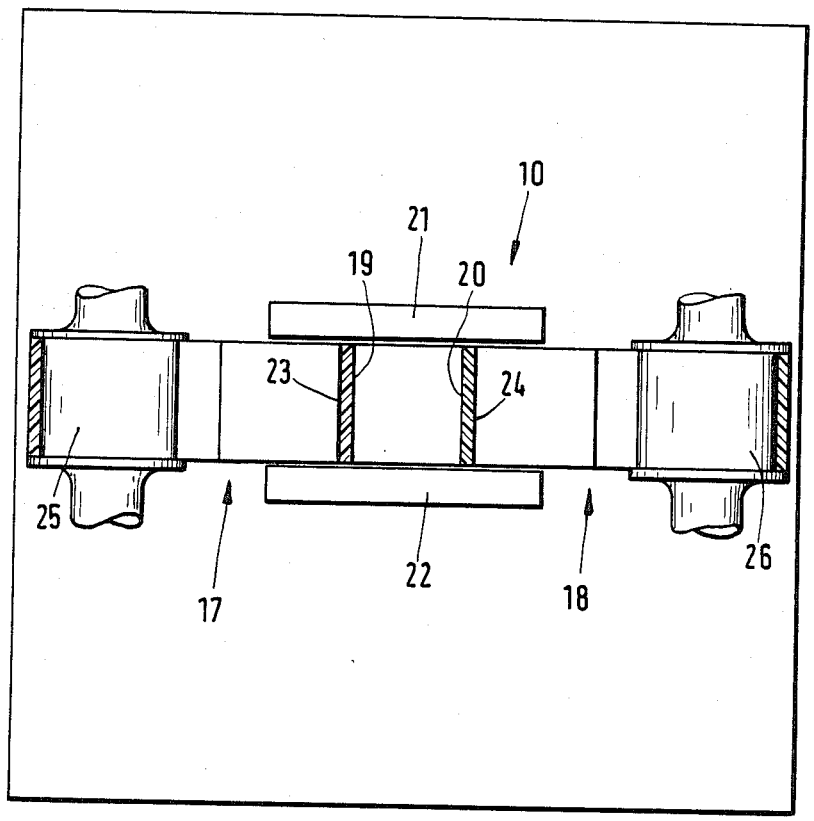
FIG. 4 is a horizontal section through a vertical conveyor well in the apparatus.

The star feeder constructed in this form and serving as intermediate conveyor 31 is rotatable by 120° at a time in one direction or the other. In the stationary position one compartment (compartment 34 in FIG. 3) is always directed upwards to receive a rough portion 28, while the other compartments 35 and 36 point obliquely downwards and sideways. These last-mentioned compartments are emptied in this position.

The balance receiver members 32 and 33 are in the present exemplary embodiment likewise in the form of star feeders, and have the same constructional features as the intermediate conveyor 31. The two balance receiver members 32, 33 in the form of star feeders are laterally offset and disposed beneath the intermediate conveyor 31, in such a manner that a rough portion 28 slipping out of the downwardly pointing compartments 35 and 36 passes into a top compartment 34 of one of the balance receiver members 32,33. In these star feeders also the tobacco portions, namely desired portions 15 or any defective portions, are emptied out of one of the downwardly or laterally directed compartments 35,36. The balance receiver members 32,33 in the form of star feeders are disposed in the direct proximity of the intermediate conveyor 31, which is likewise in the form of a star feeder.

The balance receiver members 32 and 33 are each coupled to a respective precision balance 43, 44 for the determination of the actual weight. For this purpose the star feeders constituting the balance receiver members 32,33 are rotatably connected in the region of their axes of rotation 45 to a respective carrier arm 46,47, which in turn is connected to a balance beam 48,49 of the associated precision balance 43,44. The rough portion 28 introduced into an upwardly pointing compartment 34 of the balance receiver member 32,33 is thereby directly weighed.

Through the relative positions of the balance receiver members 32,33, a difference portion can be introduced in the respective upwardly pointing compartment 34 simultaneously with and independently of the rough portion 28 until the desired portion 15 has been accurately achieved. For this purpose the respective fine metering devices 12 and 13 are disposed above and laterally offset relative to the balance receiver members 32,33, each of these devices having a transfer passage 51,52 leading into the region above the upwardly directed compartment 34 of the balance receiver member 32,33. The difference portion determined in accordance with the weight of the rough portion 28 is accordingly likewise delivered into the respective upwardly directed compartment 34. Because of the shape and dimensions of the compartments 34, 35, 36 there are no spatial bottlenecks.

The fine metering devices 12, 13 in the present exemplary embodiment are constructed substantially like the apparatus according to German Application No. A 2,338,374. Fine tobacco 53 is accordingly fed by means of a belt 54 directed obliquely downwards and taken over by a first barbed roller 55. The latter cooperates with a second barbed roller 56 for the purpose of forming as uniform as possible a layer 57 of tobacco on the first barbed roller 55. A barbed wheel 58 which then follows lifts the layer 57 of tobacco off the barbed roller 56 and delivers it onto a chute 59 directed obliquely downwards, that is to say towards the balance receiver member 32,33. The chute 59 is in turn provided with a downwardly pointing bent-over arm 60 serving as additional guide means. The beginning and the end of the fine metering process are determined by a closure flap 61, which lies against the arm 60 when the fine metering process is interrupted (shown in solid lines).

The size of the difference portion fed to the balance receiver member 32, 33 is governed on the one hand by the duration of the opening of the closure flap 61 and on the other hand by the controllable duration of the operation of the barbed rollers 55, 56,58.

In detail, the procedure comprises adjusting the balance receiver members 32, 33 to a determined switching cycle. Simultaneously with the feeding of the rough portion 28 into the compartment 34 of a balance receiver member 32, 33, a residual portion 62,63, if one is left over from the preceding metering cycle, is fed into the same compartment 34. If as a result the desired weight (desired portion 15) is achieved, the fine metering device 12, 13 does not after all come into action. The respective balance receiver member 32, 33 is on the contrary moved on one step in the cycle. If, on the other hand, the desired weight is not achieved with the aid of the residual portion 62,63, the fine metering device 12,13 is operated, with the closure flap 61 open, through the driving of the barbed rollers 55, 56, 58, in such a manner that an additional difference portion is introduced into the respective compartment 34 by way of the chute 59. When the desired weight is reached, the closure flap 61 is moved into the closed position and at the same time the barbed rollers 55, 56, 58 are halted. However, a certain residual portion 62, 63 is still formed, and is added in the manner described to the next rough portion 28.

Below the balance receiver members 32, 33, which are in the form of star feeders, outlet funnels 63, 64 and 65 are disposed in the present exemplary embodiment. The central outlet funnel 64 in the present case is formed at the top with a funnel opening 66 widened towards both sides. This opening is of such a size and so disposed that the mutually facing compartments 35 and 36, pointing downwards and towards the side, of the balance receiver members 32 and 33 empty into the outlet funnel 64. The latter serves to receive desired portions 15. The discharge conveyor 14, constructed as a trough conveyor, is advanced (cyclically) in such a manner that after each weighing and metering cycle a conveyor container 67 is situated under the outlet funnel 64. The balance receiver members 32 and 33 are accordingly turned in opposite directions when a correct desired portion 15 has been formed and is to be fed to the discharge conveyor 14. The (central) outlet funnel 64 is provided exclusively for this purpose.

The respective outer outlet funnels 63 and 65 are exclusively associated with the one and the other of the balance receiver members 32, 33. These outlet funnels 63 and 65 are so shaped that any defective portions are carried away to the side, and in any case cannot pass into the discharge conveyor 14. The outlet funnels 63 and 65 are accordingly intended for overweight defective portions and for defective portions which are below the permissible margin.

The metering device constructed in the manner described above, particularly for tobacco portions, is above all characterised by extreme precision together with gentle handling and high efficiency. Determining factors in this regard are the star feeders serving as intermediate conveyors 31, on the one hand, and the balance receiver members 32, 33, on the other hand, ensuring great efficiency through the rotary movement.

What we claim is:

1. Apparatus for forming portions of fibrous material, particularly cut tobacco, by separating a preferably underweight rough portion from a strand of the fibrous material and the addition of an equalising portion determined by the weighing of the rough portion, wherein a plurality of balances, in particular two, are adapted to be fed alternately with individual rough portions and the complete portions can be carried away, characterised in that the rough portions (28) separated from the tobacco strand (16) are each received in a compartment (34, 35, 36) of a rotatable intermediate conveyor (31) and through the partial rotation of the latter can be fed to one or the other precision balance (43,44).

2. Apparatus according to claim 1, characterised in that the intermediate conveyor (31) is in the form of a star feeder comprising three compartments (34, 35, 36) which are open on the radially outer side and extend over respective circumferential regions of about 120°, and of which in each case the upper compartment, which is open at the top, serves to receive a tobacco portion (rough portion 28), while the compartments directed downwards and to the side serve for emptying.

3. Apparatus according to claim 1 or 2, characterised in that the intermediate conveyor in the form of a star feeder is rotatable by 120° at a time in one direction or the other.

4. Apparatus according to claim 2, characterised in that the compartments (34, 35, 36) of the star feeder are bounded by radially directed partitions (37, 38, 39) which are disposed at angles of 120° from one another, and which extend between disc-like side walls (side discs 50).

5. Apparatus according to claim 4, characterised in that at the radially outer ends of the partitions (37, 38, 39) thickened portions of substantially triangular cross-section are disposed for the purpose of forming funnel-shaped guide surfaces (41) of the compartments (34, 35, 36) in the radially outer region.

6. Apparatus according to claim 4, characterised in that the partitions (37, 38, 39) form a rounding (42) of the compartments (34, 35, 36) in the radially inner region.

7. Apparatus according to claim 1, characterised in that the intermediate conveyor (31) is followed by (two)

balance receiver members (32, 33) which are connected to monitoring balances (precision balances 43, 44) and are so disposed relative to the intermediate conveyor (31) that rough portions (28) can be fed by the latter alternately to one or the other balance receiver member (32,33), particularly through the laterally and downwardly offset arrangement of the balance receiver members (32,33) relative to the intermediate conveyor (31).

8. Apparatus according to claim 7, characterised in that the balance receiver members (32, 33) are in the form of conveyors for the tobacco portions, particularly in the form of star feeders each of which has three compartments (34, 35, 36), the rotatable balance receiver members (32, 33) being fastened during the stationary state in such a manner that in each case one compartment (34) is directed upwards to receive a rough portion (28) from the intermediate conveyor (31).

9. Apparatus according to claim 8, characterised in that the balance receiver members (32, 33) in the form of star feeders are disposed axially parallel to, below and laterally offset relative to the intermediate conveyor (31) which is likewise in the form of a star feeder.

10. Apparatus according to claim 7, characterised in that the balance receiver members (32, 33) are (rotatably) connected to respective precision balances (43, 44) through their connection by means of a carrier arm (46, 47) to a balance beam (48, 49).

11. Apparatus according to claim 7, characterised in that (two) fine metering devices (12, 13) for forming difference portions are so disposed relative to the balance receiver member (32, 33) that the difference portions can be introduced into a compartment (34) which at the moment in question is at the top and open at the top in the balance receiver member (32, 33).

12. Apparatus according to claim 11, characterised in that the fine metering devices (12, 13) are provided, in the proximity of the associated balance receiver member (32, 33) and above the upwardly directed compartment (34), with a chute (59) intended for supplying the difference portion and having a movable closure flap (61), so that a difference portion can be introduced into the upwardly directed compartment (34) through the opening of the closure flap (61).

13. Apparatus according to claim 12, characterised in that during a metering cycle a residual portion (62) can first be fed into the upwardly directed compartment (34) of the balance receiver member (32, 33) and then, if necessary, a difference portion until the desired portion (15) is obtained, through the opening of the closure flap (61).

14. Apparatus according to claim 8, characterised in that below the balance receiver members (32,33) guide members, particularly outlet funnels (63, 64, 65), are disposed for feeding desired portions (15) to a discharge conveyor (14) or alternatively for carrying away defective portions.

15. Apparatus according to claim 14, characterised in that the two balance receiver members (32, 33) have associated with them a common central outlet funnel (64) having an upwardly widened funnel opening (66) for feeding desired portions (15) to the discharge conveyor (14), and also respective separate outlet funnels (63, 65) for defective portions.

16. Apparatus according to claim 1, characterised in that an upright conveyor well (10) for forming and feeding the strand (16) of tobacco consists of two conveyor belts (17, 18) which lie opposite one another and have downwardly converging conveyor faces (19, 20), and of upright well walls (21, 22) offset 90° relative to the said conveyor faces (19, 20), which extend between the upright well walls (21, 22) directed parallel to one another.

* * * * *